(12) United States Patent
Kortstock et al.

(10) Patent No.: US 8,290,723 B2
(45) Date of Patent: Oct. 16, 2012

(54) APPARATUS FOR MONITORING ROTATING COMPONENTS

(75) Inventors: Jörg Kortstock, Meldorf (DE); Heiner Kösters, Itzehoe (DE)

(73) Assignee: Sterling Industry Consult GmbH, Itzehoe (DE)

( * ) Notice: Subject to any disclaimer, the term of this patent is extended or adjusted under 35 U.S.C. 154(b) by 481 days.

(21) Appl. No.: 12/460,789

(22) Filed: Jul. 24, 2009

(65) Prior Publication Data
US 2010/0023281 A1   Jan. 28, 2010

(30) Foreign Application Priority Data
Jul. 24, 2008   (DE) .................. 20 2008 009 950 U

(51) Int. Cl.
*G01B 3/44*   (2006.01)
(52) U.S. Cl. .......................................... 702/56; 702/34
(58) Field of Classification Search ............. 702/56, 702/34, 185
See application file for complete search history.

(56) References Cited

U.S. PATENT DOCUMENTS
2005/0201472 A1* 9/2005 Loechner .............. 375/257
2008/0033695 A1* 2/2008 Sahara et al. .......... 702/185

FOREIGN PATENT DOCUMENTS
DE   19917541 A1   6/2000
DE   10228389 B4   11/2006

* cited by examiner

*Primary Examiner* — Michael Nghiem
*Assistant Examiner* — Manuel Rivera Vargas
(74) *Attorney, Agent, or Firm* — Alix, Yale & Ristas, LLP

(57) ABSTRACT

The apparatus for monitoring appliances and machines having rotating components, particularly for monitoring compressors, vacuum pumps and other pumps, has a sensor, an evaluation electronics unit and an interface for the output of signals. The evaluation electronics unit has a microprocessor having three inputs for performing measurements in three different frequency ranges at different frequency resolutions, with the respective vibration intensities being averaged at a plurality of frequencies in line with the third-octave spectrum. The interface is a two-wire interface which is used to report different operating states using different DC values.

20 Claims, 2 Drawing Sheets

APPARATUS FOR MONITORING ROTATING COMPONENTS

BACKGROUND

The invention relates to an apparatus for monitoring appliances and machines with rotating components, particularly for monitoring compressors, vacuum pumps and other pumps, having a sensor, an evaluation electronics unit and an interface for the output of signals.

In appliances and machines with rotating components, particularly also in compressors, vacuum pumps and other pumps, it is at least expedient—in many other cases even prescribed and absolutely necessary—to continually check whether the appliance or the machine is still operating perfectly. In many cases, it is undesirable and infeasible to wait until the machine or the appliance breaks down. This is particularly true in the case of pumps, e.g. in industrial installations, where not only may entire installation parts break down when a pump fails but where relatively great damage may also arise on account of the failure. There is therefore a great deal of concern that abnormalities in operating behavior be detected before the pump fails so that the necessary measures can be initiated (switching off an installation part, rerouting currents, etc.). Examples of faults which one would wish to detect are bearing wear, imbalance, disorientation, pipeline distortion, cavitation phenomena, etc.

The prior art for vibration monitoring firstly covers intermittent measurements using a handheld measuring instrument (cf. DE 199 17 541 A1, for example). The measurements using a handheld measuring instrument have the drawback that no continuous monitoring is performed, which means that temporary inadmissible operating states which would result in premature damage to the pump are not recognized. Reliable state monitoring is therefore not possible. Damage which appears outside the measurement cycle is not recognized either. In addition, expert knowledge is required in order to evaluate the measured data. For measurements in the chemical industry, where there are areas with an explosion risk, the handheld measuring instruments need to be protected against explosion.

Further measuring systems for vibration monitoring based on the prior art use one or more vibration sensors. These sensors continuously capture information about the vibration behavior and are combined in an external evaluation unit. The evaluation unit performs the signal analysis. The evaluation unit monitors threshold values and/or provides extensive trend information from frequency analysis. The communication for process control is carried out by switching contacts, serial interfaces or using field bus systems. The drawback of such systems is that they are expensive to purchase and complex to install, since sensors and evaluation electronics are installed at separate locations. The interface link to the process control is also complex. In addition, extensive expert knowledge is required in order to configure such systems and in order to evaluate the measured data. For areas with a risk of explosion, it is not only necessary to use vibration sensors which are protected against explosion; rather, the connection to the evaluation appliances must also be made using appropriate explosion protection barriers. This makes such systems complex and expensive.

DE 102 28 389 B4 discloses a vibration sensor of the type cited at the outset for monitoring the state of rotating components or bearings with an integrated signal conditioning unit. For the purpose of communication for process control, there are two switching outputs available, one switching output tripping a preliminary alarm and the other switching output tripping a main alarm. For monitoring vibrations in bearings, the system is configured at bearing frequencies, and in the case of rotating components at freely selectable frequency amplitudes. The level adjustment is performed using calibration in normal operation. The drawback of this system is that the communication for process control is effected only using two switching contacts. Continuous trend data therefore cannot be transmitted. In addition, expert knowledge is necessary in order to configure such a system.

In particular, however, there is the drawback that frequency analysis requires many measurement points which are recorded at a high sampling frequency. For an accuracy of 0.5 Hz in the frequency spectrum, which is at least necessary for low frequencies, and a frequency range up to 10 kHz, the time signal needs to be sampled at least twice the frequency of the maximum frequency of the spectrum (Nyquist theorem). The sampling frequency therefore needs to be 20,000 values per second. The storage depth, which is equal to the sampling frequency divided by the frequency resolution, then needs to be 40,000 values per measurement. The processing (Fourier transformation) of this large volume of data requires a high computer power and a corresponding large main memory. The high computer power which is required necessitates a high power consumption, however. The large currents again mean that particularly complex measures need to be taken for explosion protection in environments with a risk of explosion. If the total power consumption is no more than 20 mA, it is possible to implement the intrinsically safe circuit. This can then be operated without special measures in the environment with a risk of explosion. On the basis of the prior art, these currents are not sufficient to operate microprocessors which need to process the aforementioned volume of data.

An object is to provide an apparatus of the type cited at the outset which allows the rotating components to be monitored using little computation power and hence low power consumption. In addition, the interface is intended to be able to be used to output different data about the operating state.

SUMMARY

Briefly stated, an apparatus for monitoring appliances and machines having rotating components such as monitoring compressors, vacuum pumps and other pumps has a sensor, an evaluation electronics unit and an interface with the output of signals. The evaluation electronics unit has a microprocessor having three inputs for performing measurements in three different frequency ranges at different frequency resolutions, with the respective vibration intensities being averaged at a plurality of frequencies in line with the third-octave spectrum. The interface is a two-wire interface which is used to report different operating states using different DC values.

The interface is a 4 to 20 mA interface. The first and second frequency ranges each comprise three octaves and the third frequency range comprises two octaves. The frequency resolution is 0.5 Hz in the first frequency range, 5 Hz in the second frequency range and 50 Hz in the third frequency range. The apparatus is designed for performing measurements in the range from 10 Hz to 5600 Hz. The apparatus is designed to report different operating states or faults using signals differing by 1 mA on the interface. The signals, in one embodiment, have values from 8 mA to 20 mA. The apparatus is designed to transmit the complete vibration data and is equipped with devices for calibration. The apparatus has memory for selected parameter values and limit values.

The apparatus has high-order, at least fourth order low-pass filters for the three frequency ranges. The apparatus has gain controllers for the signals in the three frequency ranges. The interface is HART compatible. At least one display for the operating state of the appliance or the machine is provided. The apparatus is designed to monitor the vibration speed and has explosion protection type "intrinsically safe circuit".

BRIEF DESCRIPTION OF THE DRAWINGS

The invention is described below by way of example using advantageous embodiments with reference to the appended drawings wherein.

DETAILED DESCRIPTION

Figure 1:
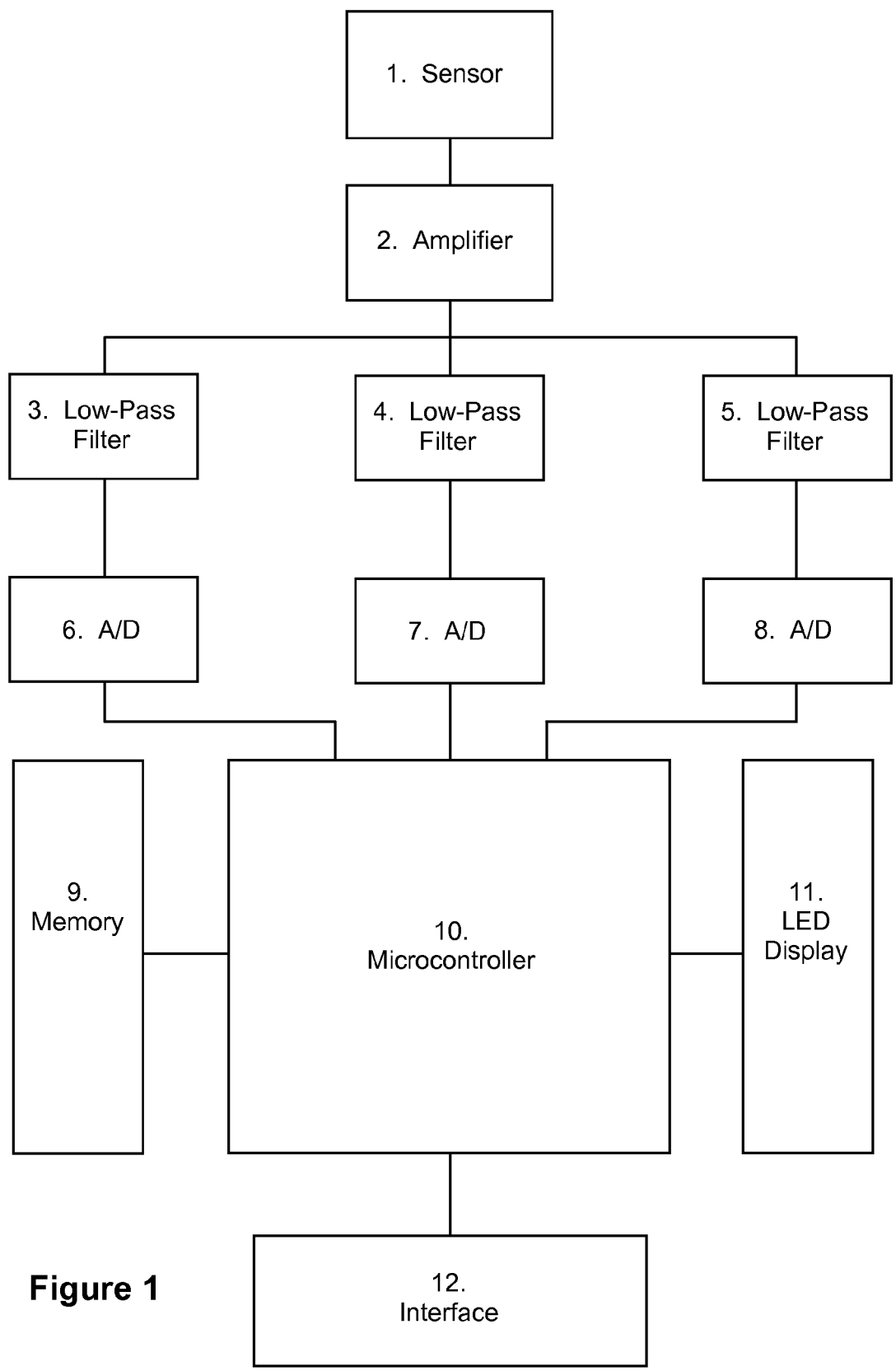
FIG. 1 is a schematic view of an apparatus for monitoring rotating components.

With reference to the drawings wherein like numerals represent like parts, FIG. 1 shows a sensor 1 which is connected via an amplifier 2 to three high-order low-pass filters 3, 4 and 5 for cutoff frequencies of 100 Hz, 1000 Hz and 10 kHz. The analog signals are then converted into digital signals in analog/digital converters 6, 7 and 8 and are supplied to the microcontroller 10. The numeral 9 denotes a memory for parameters and data, while the numeral 11 denotes an LED display. Finally, the numeral 12 denotes the 4 to 20 mA interface.

Figure 2:
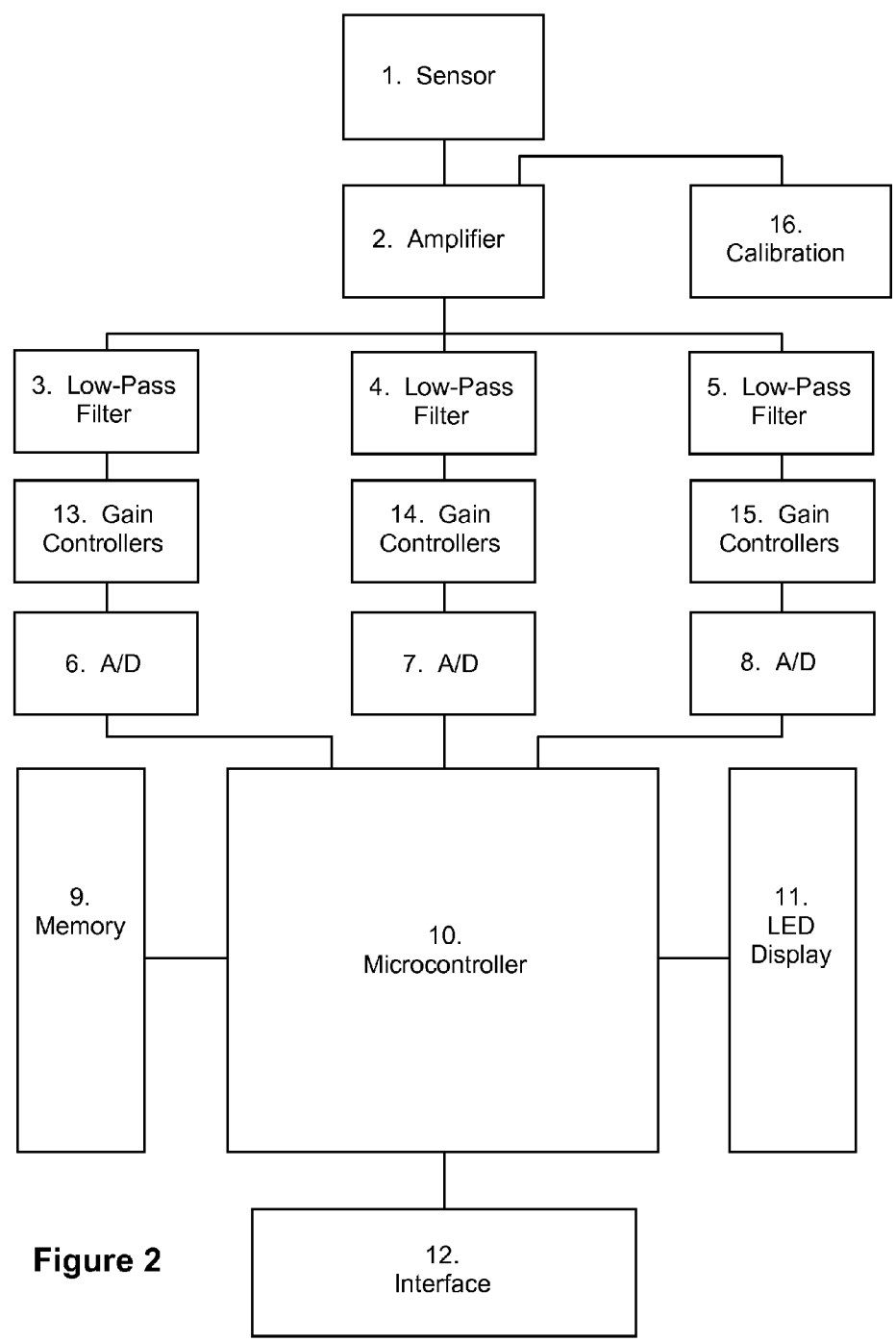
FIG. 2 is a schematic view of a second embodiment of an apparatus for monitoring rotating components.

FIG. 2 shows an embodiment with gain controllers 13, 14 and 15 for the signals in the three frequency ranges. In addition, a device for calibration 16 is provided with which signals for calibration are supplied to amplifier 2.

An evaluation electronics unit has a microprocessor 10 having three inputs for performing measurements in three different frequency ranges at different frequency resolutions, with the respective vibration intensities being averaged at a plurality of frequencies in line with the third-octave spectrum, and involves the interface 12 being a two-wire interface which is used to report different operating states using different DC values.

A spectrum with relatively good resolution (frequency resolution) is required only for relatively low frequencies, whereas a lower frequency resolution is sufficient for higher frequencies. In this context, the sensor makes use of what is known as the third-octave spectrum, which is known from hearing aid engineering, inter alia. The spectrum which is calculated by the Fourier transformation then has far fewer values which are obtained at lower computation power. The evaluation can then also be performed at lower computation power.

Advantageously, the interface 12 is a 4 to 20 mA interface. This is a standard interface which can also be used in environments with a risk of explosion, since a current of 20 mA cannot generate any sparks.

Expediently, the first and second frequency ranges each comprise three octaves and the third frequency range comprises two octaves. In this case, it is particularly expedient if the frequency resolution is 0.5 Hz in the first frequency range, 5 Hz in the second frequency range and 50 Hz in the third frequency range. In this context, a plurality of individual frequencies are combined to form a frequency band with a center frequency. These frequency bands, with a respective lower and upper corner frequency around the center frequency, are assigned an RMS value. Only the intensity values of these frequency bands are then processed further.

Expediently, the apparatus is designed for performing measurements in the range from 10 Hz to 5600 Hz. This is sufficient to detect all faults which occur in pumps in practice on the rotating parts.

Expediently, the apparatus is designed to report different operating states or faults using signals differing by 1 mA on the interface. In this case, a value range from 8 mA to 20 mA is expediently selected for the signals. A current of 8 mA would report a first operating state, a current of 9 mA would report a second operating state, etc. The 4 to 20 mA interface can thus report all adverse operating states. In addition, one advantageous embodiment may have provision for the apparatus to be designed to transmit the complete vibration data so that said data can be evaluated in an external computer, for example.

Expediently, the apparatus is equipped with a device for calibration 16. When the apparatus has been fitted to the pump, the calibration can be performed while the pump is running. The preselections which are required for the relevant applications may already be stored in the apparatus. In this context, the calibration can be started by pushing a button or by software. After the calibration, the sensor informs the operating personnel in the event of discrepancies from normal operation. The selected parameter values and limit values are stored in the memory of the sensor and are also available after the power supply is removed.

If the sampling frequency does not have at least twice the value of the highest frequency to be measured, what is known as the alias effect occurs, that is to say that incorrect values are interpreted. It is therefore at least-extremely expedient to use high-order, at least fourth-order, low-pass filters 3, 4 and 5 for the three frequency ranges, said filters effectively cutting off higher frequencies. The relevant three low-pass filters 3, 4 and 5 are arranged upstream of the three analog inputs of the microprocessor 10.

It is also very expedient if gain controllers 13, 14 and 15 are provided for the signals in the three frequency ranges, so that the signals at the inputs of the microprocessor always have sufficient magnitude to be processed effectively and correctly.

Expediently, the interface 12 is HART compatible, since this allows vibration data to be transmitted to a large number of evaluation appliances without significant matching problems. In addition, provision is expediently made for the apparatus to have at least one display 11 for the operating state of the appliance or the machine, particularly the pump.

In addition, the apparatus is expediently designed such that not only are possible faults detected but also the vibration frequency is monitored.

The apparatus may be of relatively small design and is fitted directly to the appliance, particularly the pump, so that it has good acoustic contact. This can be done by means of screws, for example.

Startup and operation do not require any special knowledge of vibration measurement engineering. The sensor 1 may be equipped with the necessary software and preset for most applications.

The measurement and evaluation are performed in the following way:

Three mutually independent frequency analyses are performed.

Frequency Analysis—Microprocessor—Analog Input 1:

4th-order 100-Hz low-pass filter

Sampling frequency based on sampling theorem 512 values/sec

Storage depth 1024 values

Frequency resolution=sampling frequency/storage depth=0.5 Hz (0/0.5/1/1.5/ . . . /110 Hz)

For each frequency line, the FFT (Fast Fourier Transformation) calculates an amplitude.

Calculation of the Third-octave Spectrum:

The third-octave spectrum is calculated from the individual amplitudes of the FFT as follows:

| Third-octave center frequency (Hz) | Lower corner frequency (Hz) | Upper corner frequency (Hz) | Bandpass frequency values |
| --- | --- | --- | --- |
| 13 | 11 | 14 | 3 Hz/6 values |
| 16 | 14 | 18 | 4 Hz/8 values |
| 20 | 18 | 22 | 4 Hz/8 values |
| 25 | 22 | 28 | 6 Hz/12 values |
| 32 | 28 | 35 | 7 Hz/14 values |
| 40 | 35 | 44 | 9 Hz/18 values |
| 50 | 44 | 56 | 12 Hz/24 values |
| 63 | 56 | 70 | 14 Hz/28 values |
| 80 | 70 | 88 | 18 Hz/36 values |
| 100 | 88 | 110 | 22 Hz/44 values |

$$\text{Third-octave\_Rms}_{centerfrequency} = \sqrt{\frac{\sum_{lowercornerfrequency}^{uppercornerfrequency} \text{Amplitude}^2}{\text{Number of values}}}$$

Frequency Analysis—Microprocessor—Analog Input 2:
4th-order 1000-Hz low-pass filter
Sampling frequency based on sampling theorem 512 values/sec
Storage depth 1024 values
Frequency resolution=sampling frequency/storage depth=5 Hz (110/115/120, . . . 1100 Hz)
For each frequency line, the FFT calculates an amplitude.
Calculation of the Third-octave Spectrum:
The third-octave spectrum is calculated from the individual amplitudes of the FFT as follows:

| Third-octave center frequency (Hz) | Lower corner frequency (Hz) | Upper corner frequency (Hz) | Bandpass frequency values |
| --- | --- | --- | --- |
| 130 | 110 | 140 | 30 Hz/6 values |
| 160 | 140 | 180 | 40 Hz/8 values |
| 200 | 180 | 220 | 40 Hz/8 values |
| 250 | 220 | 280 | 60 Hz/12 values |
| 320 | 280 | 350 | 70 Hz/14 values |
| 400 | 350 | 440 | 90 Hz/18 values |
| 500 | 440 | 560 | 120 Hz/24 values |
| 630 | 560 | 700 | 140 Hz/28 values |
| 800 | 700 | 880 | 180 Hz/36 values |
| 1000 | 880 | 1100 | 220 Hz/44 values |

$$\text{Third-octave\_Rms}_{centerfrequency} = \sqrt{\frac{\sum_{lowercornerfrequency}^{uppercornerfrequency} \text{Amplitude}^2}{\text{Number of values}}}$$

Frequency Analysis—Microprocessor—Analog Input 3:
4th-order 10 000-Hz low-pass filter
Sampling frequency based on sampling theorem 51 200 values/sec
Storage depth 1024 values
Frequency resolution=sampling frequency/storage depth=50 Hz (1100/1150/1200, . . . 5600 Hz)
For each frequency line, the FFT calculates an amplitude.
Calculation of the Third-octave Spectrum:
The third-octave spectrum is calculated from the individual amplitudes of the FFT as follows:

| Third-octave center frequency (Hz) | Lower corner frequency (Hz) | Upper corner frequency (Hz) | Bandpass frequency values |
| --- | --- | --- | --- |
| 1300 | 1100 | 1400 | 300 Hz/6 values |
| 1600 | 1400 | 1800 | 400 Hz/8 values |
| 2000 | 1800 | 2200 | 400 Hz/8 values |
| 2500 | 2200 | 2800 | 600 Hz/12 values |
| 3200 | 2800 | 3500 | 700 Hz/14 values |
| 4000 | 3500 | 4400 | 900 Hz/18 values |
| 5000 | 4400 | 5600 | 1200 Hz/24 values |

$$\text{Third-octave\_Rms}_{centerfrequency} = \sqrt{\frac{\sum_{lowercornerfrequency}^{uppercornerfrequency} \text{Amplitude}^2}{\text{Number of values}}}$$

The invention claimed is:

1. An apparatus for monitoring appliances and machines having rotating components, particularly for monitoring compressors, vacuum pumps and pumps, said apparatus having a sensor, an evaluation electronics unit and an interface for the output of signals, wherein the evaluation electronics unit has a microprocessor having three inputs for performing measurements of vibration intensities in three different frequency ranges at different frequency resolutions, each frequency range including at least one octave and each octave is divided into three third-octave spectra with the respective measured vibration intensities being averaged for each third-octave spectrum, and wherein the interface is a two-wire interface which is used to report different operating states of the appliance or machine being monitored using different DC values.

2. The apparatus as claimed in claim 1, wherein the interface is a 4 to 20 mA interface.

3. The apparatus as claimed in claim 2, wherein said three different frequency ranges comprise first, second and third frequency ranges and the first and second frequency ranges each comprise three octaves and the third frequency range comprises two octaves.

4. The apparatus as claimed in claim 3, wherein the frequency resolution is 0.5 Hz in the first frequency range, 5 Hz in the second frequency range and 50 Hz in the third frequency range.

5. The apparatus as claimed in claim 2, wherein it is designed for performing measurements in the range from 10 Hz to 5600 Hz.

6. The apparatus as claimed in claim 2, wherein it is designed to report different operating states or faults using signals differing by 1 mA on the interface.

7. The apparatus as claimed in claim 1, wherein said three different frequency ranges comprise first, second and third frequency ranges, said first frequency range including the lowest measured frequencies and said third frequency range including the highest measured frequencies and the first and second frequency ranges each comprise three octaves and the third frequency range comprises two octaves.

8. The apparatus as claimed in claim 7, wherein the frequency resolution is 0.5 Hz in the first frequency range, 5 Hz in the second frequency range and 50 Hz in the third frequency range.

9. The apparatus as claimed in claim 1, wherein it is designed to report different operating states or faults using signals differing by 1 mA on the interface.

10. The apparatus as claimed in claim 9, wherein the signals have values from 8 mA to 20 mA.

11. The apparatus as claimed in claim 1, wherein it is designed for performing measurements in the range from 10 Hz to 5600 Hz.

12. The apparatus as claimed in claim 1, wherein it is designed to transmit the complete vibration data.

13. The apparatus as claimed in claim 1, wherein it is equipped with devices for calibration.

14. The apparatus as claimed in claim 1, wherein it has a memory for selected parameter values and limit values.

15. The apparatus as claimed in claim 1, wherein it has high-order, at least fourth-order, low-pass filters for the three frequency ranges.

16. The apparatus as claimed in claim 1, wherein it has gain controllers for the signals in the three frequency ranges.

17. The apparatus as claimed in claim 1, wherein the interface is HART compatible.

18. The apparatus as claimed in claim 1, wherein it has at least one display for the operating state of the appliance or the machine.

19. The apparatus as claimed in claim 1, wherein it is designed to monitor vibration speed.

20. The apparatus as claimed in claim 1, wherein the appliance has an explosion protection type circuit in which no current exceeds 20 mA.

\* \* \* \* \*